US007337657B2

(12) United States Patent
Haussner et al.

(10) Patent No.: US 7,337,657 B2
(45) Date of Patent: Mar. 4, 2008

(54) PRESSURE GLOW PLUG FOR A DIESEL ENGINE

(75) Inventors: Michael Haussner, Benningen (DE); Ulf Wyrwich, Pleidelsheim (DE); Hans Houben, Wuerselen (DE); Frank Pechhold, Ludwigsburg (DE); Heinz-Georg Schmitz, Marbach (DE); Dirk Von Hacht, Grossbottwar (DE); Marc Gerard Johan Borgers, VT Enschede (NL); Albert Ferdinand Zwijze, RD Vriezenveen (NL); Paulus Thomas Johannes Gennissen, DG Enschede (NL); Ronald De Groot, HP Vroomshoop (NL); Arie-Jan Koelling, KC Enschede (NL)

(73) Assignees: Beru AG, Ludwigsburg (DE); Texas Instruments Holland B.V., Em Almelo (NL)

( * ) Notice: Subject to any disclaimer, the term of this patent is extended or adjusted under 35 U.S.C. 154(b) by 0 days.

(21) Appl. No.: 10/944,403

(22) Filed: Sep. 20, 2004

(65) Prior Publication Data

US 2005/0061063 A1 Mar. 24, 2005

(30) Foreign Application Priority Data

Sep. 19, 2003 (DE) ................................ 103 43 521

(51) Int. Cl.
*G01M 15/00* (2006.01)

(52) U.S. Cl. ........................................ 73/115; 73/35.12

(58) Field of Classification Search ............... 73/35.01, 73/35.03, 35.06, 35.07, 35.12, 35.13, 112, 73/115, 116, 117.2, 117.3, 118.1
See application file for complete search history.

(56) References Cited

U.S. PATENT DOCUMENTS

| | | | | |
|---|---|---|---|---|
| 5,922,229 | A | 7/1999 | Kurano | |
| 6,575,039 | B2 * | 6/2003 | Murai et al. | 73/756 |
| 6,948,372 | B2 * | 9/2005 | Skinner et al. | 73/714 |
| 2001/0008090 | A1 * | 7/2001 | Murai et al. | 73/756 |
| 2001/0015402 | A1 * | 8/2001 | Murai et al. | 248/554 |
| 2004/0083795 | A1 * | 5/2004 | Butler et al. | 73/35.12 |
| 2004/0182144 | A1 * | 9/2004 | Okazaki et al. | 73/118.1 |
| 2004/0182145 | A1 * | 9/2004 | Okazaki et al. | 73/119 R |
| 2005/0150301 | A1 * | 7/2005 | Skinner et al. | 73/714 |

FOREIGN PATENT DOCUMENTS

| | | | |
|---|---|---|---|
| DE | 41 32 842 | A1 | 4/1993 |
| DE | 102 18 544 | A1 | 11/2002 |
| EP | 1 096 141 | A3 | 5/2001 |
| EP | 1 134 385 | A2 | 9/2001 |
| JP | 59-60237 | | 4/1984 |
| JP | 59-85932 | | 5/1984 |

* cited by examiner

*Primary Examiner*—Eric S. McCall
(74) *Attorney, Agent, or Firm*—David S. Safran

(57) ABSTRACT

A pressure glow plug for a diesel engine has a glow plug body 2 for being inserted into a cylinder of the diesel engine, a heating rod 1 that is arranged in the glow plug body 2 and a pressure sensor 9 that is arranged between the heating rod 1 and the glow plug body 2 in such a way that the pressure in the combustion chamber of the cylinder that is transmitted by the heating rod 1 influences the pressure sensor 9. The heating rod 1 is arranged in the glow plug body 2 such that it can be displaced in an axially sliding fashion, namely by a corresponding sliding element, for example, a membrane 7 or seals 3.

20 Claims, 8 Drawing Sheets

PRESSURE GLOW PLUG FOR A DIESEL ENGINE

BACKGROUND OF THE INVENTION

1. Field of the Invention

The invention relates to a pressure glow plug for a diesel engine that comprises a glow plug body for being inserted into a cylinder of the diesel engine, a heating rod that is arranged in the glow plug body and a pressure sensor that is arranged between the heating rod and the glow plug body under a prestress in such a way that the pressure sensor is acted upon by the pressure in the combustion chamber of the cylinder that is transmitted by the heating rod.

2. Description of Related Art

A pressure glow plug of the above-mentioned type is known from published European Patent Application EP 1 096 141 A3.

In this known pressure glow plug, the glow plug body and the heating rod are rigidly connected to one another on the combustion chamber side, and the glow plug body has such a stability that it is able to radially deform in an elastic manner when pressure is applied. The pressure in the combustion chamber of the cylinder acts upon the glow plug body and the heating rod such that the glow plug body that is rigidly seated in the cylinder of the internal combustion engine is elastically deformed while the heating rod is axially displaced relative to the glow plug body. This movement relative to the glow plug body causes the prestressed pressure sensor to be relieved, wherein the difference in the charge state between the prestressed and the relieved state is tapped in the form of a signal for the pressure in the combustion chamber and evaluated.

Such a pressure glow plug serves as a cold-starting aid in order to start the diesel engine at low temperatures and for realizing an intermediate glow function under unfavorable operating conditions, wherein the pressure sensor that may consist, for example, of a piezoelectric ceramic material or a strain gauge makes it possible to obtain information on the combustion process in the cylinder, as well as to evaluate this information and to control the combustion process accordingly. The utilization of such a pressure glow plug results in a diesel engine that can be regulated with respect to the reduction of exhaust gases and the fuel consumption.

However, one disadvantage of known pressure glow plugs is that the transmission of the pressure to the pressure sensor is dependent on the geometry and the stability of the glow plug body.

SUMMARY OF THE INVENTION

The invention is based on the objective of developing a pressure glow plug of the initially mentioned type in such a way that the transmission of pressure is no longer dependent on the geometry and the stability of the glow plug body and the signal for the pressure in the combustion chamber of the cylinder is not influenced by the geometry and the stability of the glow plug body.

According to the invention, this objective is attained in that the heating rod is arranged in the glow plug body such that it can be displaced in an axially sliding fashion, and in that the heating rod transmits the pressure in the combustion chamber of the cylinder to the pressure sensor.

In the pressure glow plug according to the invention, the combustion pressure is directly transmitted via the heating rod, namely without the geometry and the stability of the glow plug body being included in or having an influence on this pressure transmission. The glow plug is able to perform all conventional functions.

This makes it possible to obtain and evaluate information on the occurring combustion process, as well as to directly and immediately manipulate the combustion process in order to respectively reduce or optimize emission values, consumption values, the noise development and an increase in power. A correspondingly controlled diesel engine can be realized due to the fact that the glow plug body and the pressure sensor are essentially arranged independently and not rigidly coupled to one another.

Preferred embodiments of the invention are described in greater detail below with reference to the figures.

DETAILED DESCRIPTION OF THE INVENTION

Figure 1:
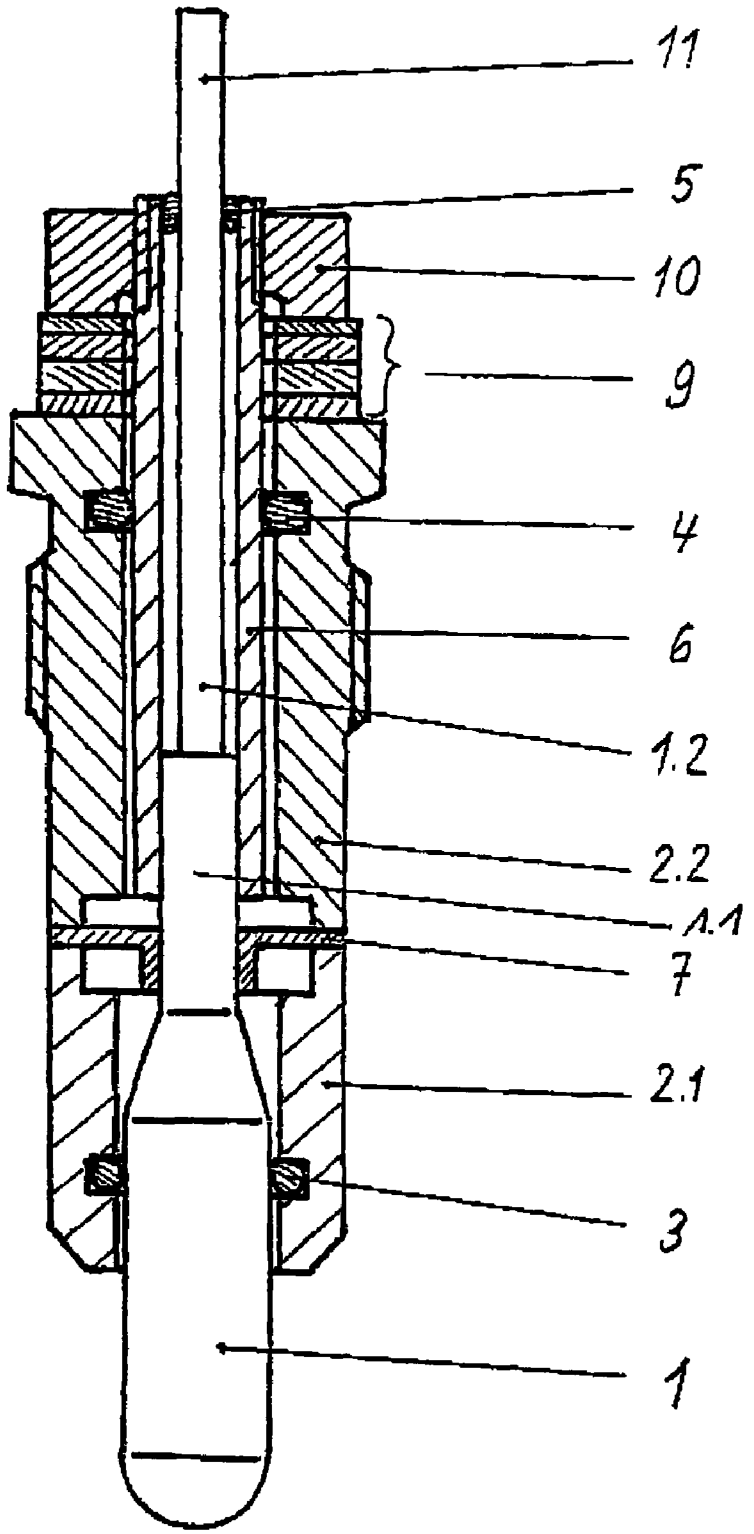
FIG. 1 shows a section through a first embodiment of the pressure glow plug according to the invention.

The first embodiment of the pressure glow plug according to the invention that is illustrated in FIG. 1 comprises a heating rod 1 arranged in a glow plug body, wherein the glow plug body is composed of two parts, namely an upper part 2.2 on the connection end and a lower part 2.1 on the combustion chamber side. The heating rod 1 has a reduced diameter in the region of the connection end, and a membrane 7 is fixed to the heating rod 1 in this region. The membrane 7 is realized in such a way that it transmits the heat of the heating rod 1 to the glow plug body 2, ensures the ground connection required for the glow function of the pressure glow plug and seals the arrangement in a gas-tight fashion in the direction of the connection end of the glow plug. For this purpose, the membrane 7 is rigidly arranged on the end face of the upper body part 2.1, for example, by means of laser welding.

A contact tube 6 extends from the membrane 7 in the direction of the connection end of the glow plug, and the contact tube is fixed on the glow tube 1.1 of the heating rod 1. The internal pole 1.2 of the heating rod 1 and the contact tube 6 extend beyond the glow plug housing 2 on the connection end, and an O-ring 4 is provided in the part of the glow plug housing on the connection end. This O-ring centers the extension of the heating rod 1 in the upper part 2.2 of the glow plug body by means of the contact tube 6.

The lower part 2.1 of the glow plug body also contains an O-ring 3 that centers and seals the heating rod 1 relative to the lower part 2.1 of the glow plug body in such a way that the combustion pressure in the cylinder is transmitted to the membrane 7 via the heating rod 1 exclusively.

The lower part 2.1 and the upper part 2.2 of the glow plug body and the membrane 7 situated in between are preferably welded together by means of laser welding.

The electrical connection of the pressure glow plug is realized with the aid of the connection 11 and the internal pole 1.2, wherein the connection may be realized in the form of a threaded or a plug-type connection.

At the end on the connection side, a sealing element in the form of an O-ring 5 is provided between the internal pole 1.2 and the contact tube 6.

A pressure sensor arrangement 9 is situated on the end face of the connection end of the upper glow plug body part 2.2 and is insulated relative thereto. The sensor arrangement 9 is arranged between the glow plug body 2 and the contact tube 6 under a prestress. For this purpose, a tensioning element 10 may be provided that is suitably fixed on the contact tube 6, for example, screwed, welded or crimped thereon.

With respect to its function, the above-described pressure glow plug operates as described below:

The pressure in the cylinder of the diesel engine is exerted upon the heating rod 1 such that the heating rod 1 is axially displaced and the membrane 7 causes the contact tube 6 to be displaced relative to the part 2.2 of the glow plug body 2 on the connection end. This relative movement is transmitted to the prestressing device, namely the tensioning element 10, and causes the prestressed pressure sensor arrangement 9 to be relieved. This results in a charge or voltage change that can be detected by an electronic circuit and evaluated. The prestress of the sensor arrangement 9 serves for obtaining a signal change that can be evaluated when the sensor is relieved.

Information on the respective cylinder pressure can be obtained by evaluating the signals of the sensor arrangement 9.

Figure 2A:
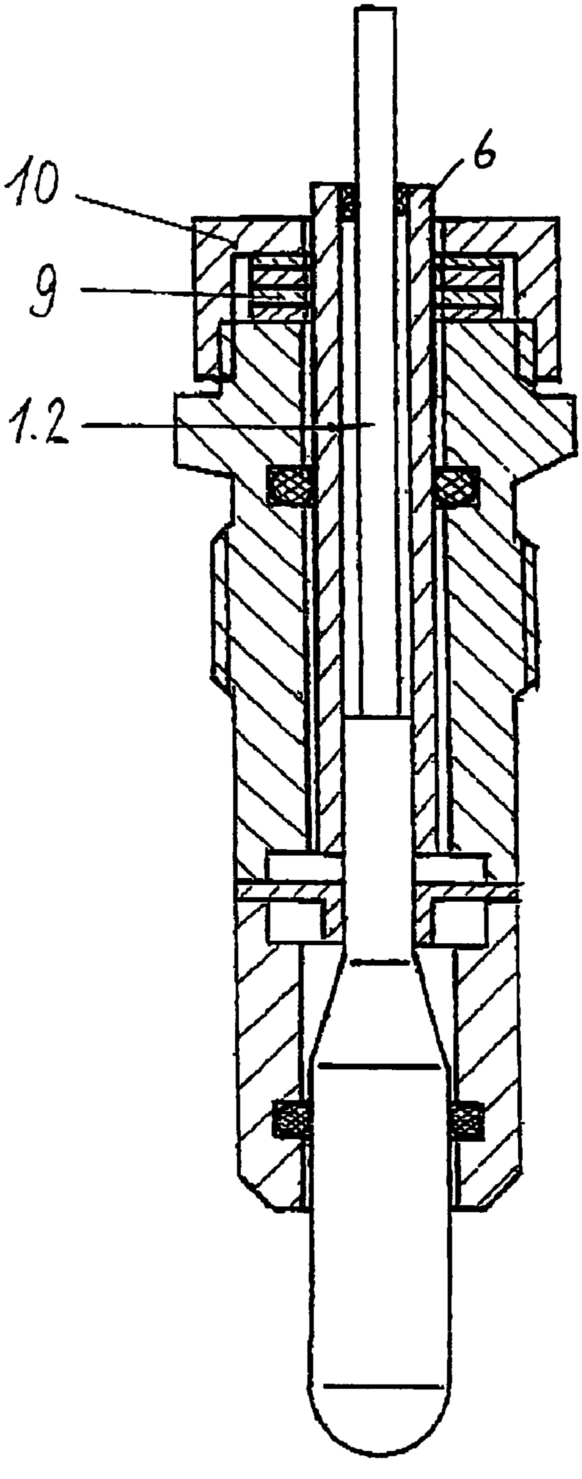
FIG. 2A and FIG. 2B are sectional views of two variations of a second embodiment of the pressure glow plug according to the invention.
Figure 2B:
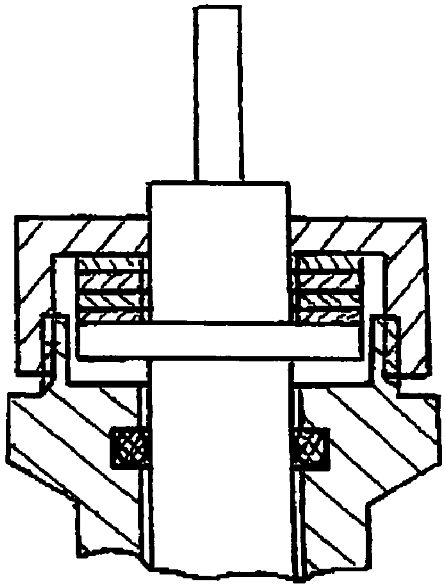

FIGS. 2A and 2B show two variations of a second embodiment of the pressure glow plug according to the invention, wherein the second embodiment has the same basic design as the embodiment illustrated in FIG. 1.

In contrast to the embodiment illustrated in FIG. 1, the sensor arrangement 9 is supported in an insulated fashion on a shoulder of the contact tube 6 as shown in FIG. 2A or on a support ring that is fixed on the contact tube 6 as shown in FIG. 2B or directly on the end of the contact tube 6 that is braced relative to the upper part 2.2 of the glow plug body by means of the tensioning element 10.

It is also possible to directly arrange the shoulder for supporting the sensor arrangement 9 or the corresponding support ring on the internal pole.

In this second embodiment, the cylinder pressure acting upon the heating rod 1 leads to an increase in the pressure acting upon the sensor arrangement 9 because the sensor arrangement 9 is more intensely pressed against the tensioning element 10 connected to the upper part 2.2 of the glow plug body. The thusly occurring change in the output signal of the sensor arrangement 9 can be evaluated analogous to the first embodiment.

Figure 3A:
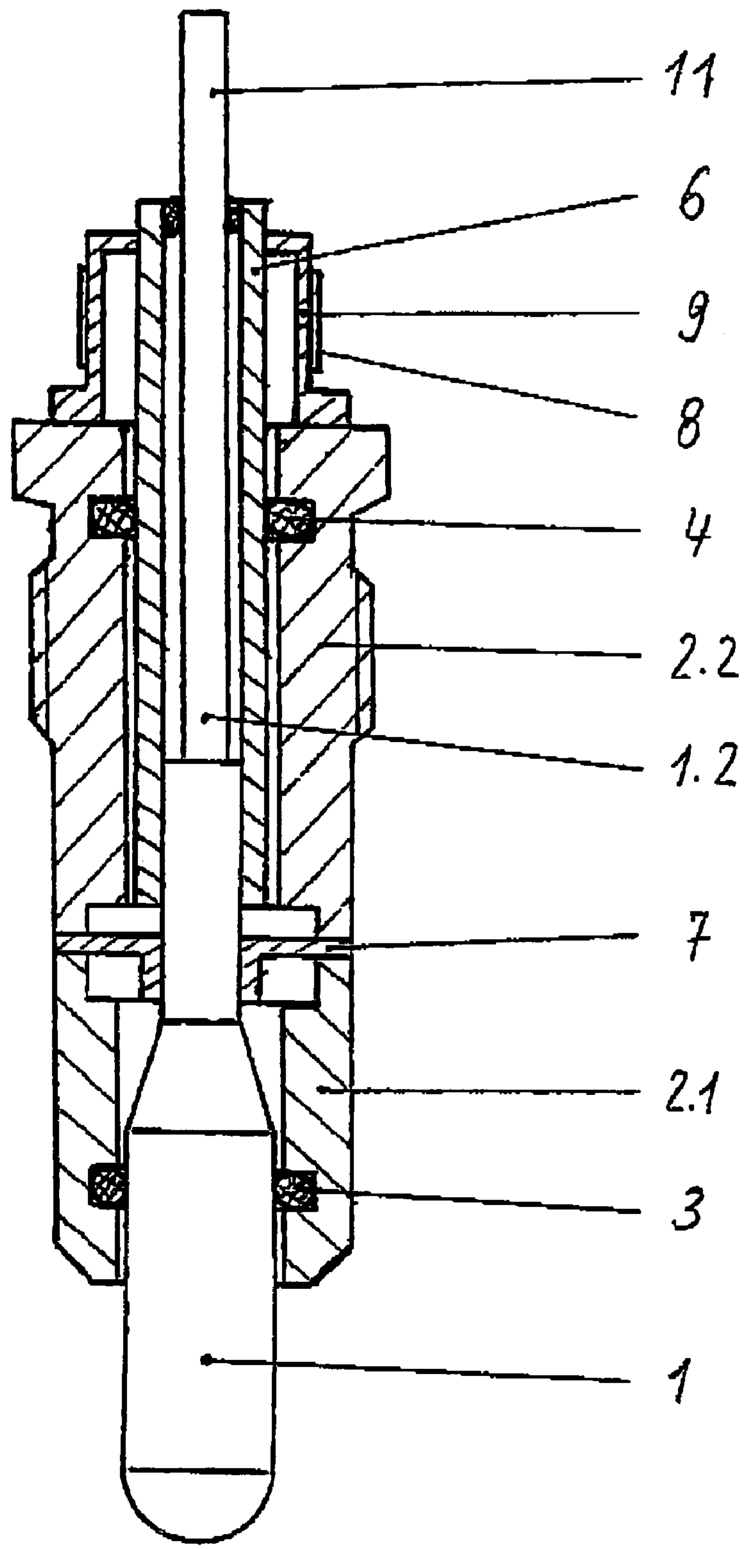
FIGS. 3A and 3B are sectional views of two variations of a third embodiment of the pressure glow plug according to the invention.
Figure 3B:
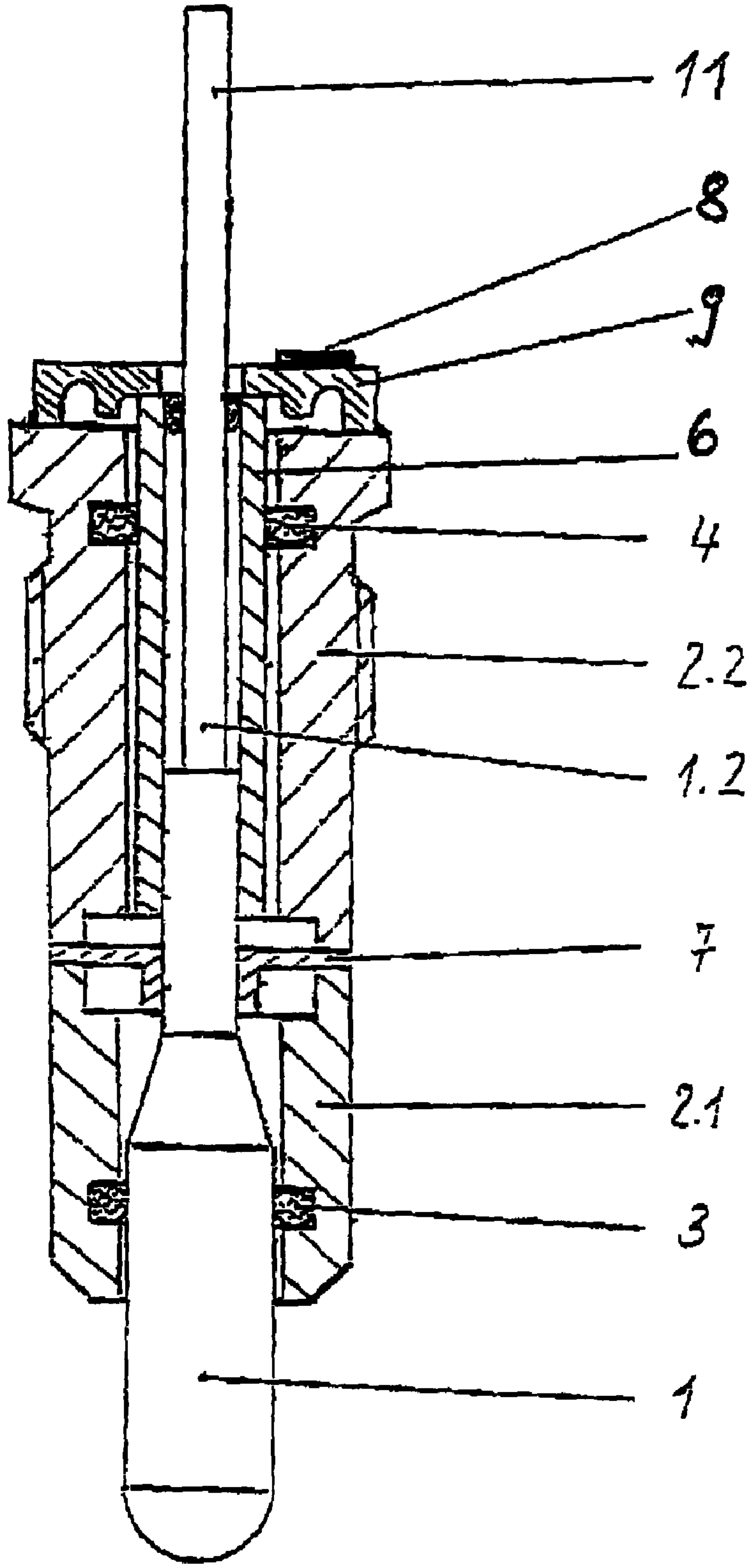

FIGS. 3A and 3B show a third embodiment of the pressure glow plug according to the invention, the basic design of which corresponds to that of the first two embodiments illustrated in FIGS. 1 and 2.

In the embodiment illustrated in FIG. 3A, a sensor element 8 that is realized, for example, in the form of a strain gauge, is arranged on a carrier element 9, for example, a bowl-type membrane, that has a defined flexibility in the axial direction, wherein the sensor element is directly fixed between the contact tube 6 and the upper part 2.2 of the glow plug body 2, for example, by means of welding.

In this embodiment, the movement of the heating rod 1, or its extension in the form of the contact tube 6, relative to the upper part 2.2 of the glow plug body leads to an elongation of the flexible carrier element 9 due to the increasing cylinder pressure. The resulting tensile stress or elongation of the sensor element 8 causes a signal change that can be detected and evaluated.

In the variation of the third embodiment that is illustrated in FIG. 3B, the sensor element, e.g., the strain gauge, is arranged radially. In this embodiment, a pressure acting upon or a deformation of the sensor element is not only detected in the axial direction, but also in the radial direction.

Figure 4:
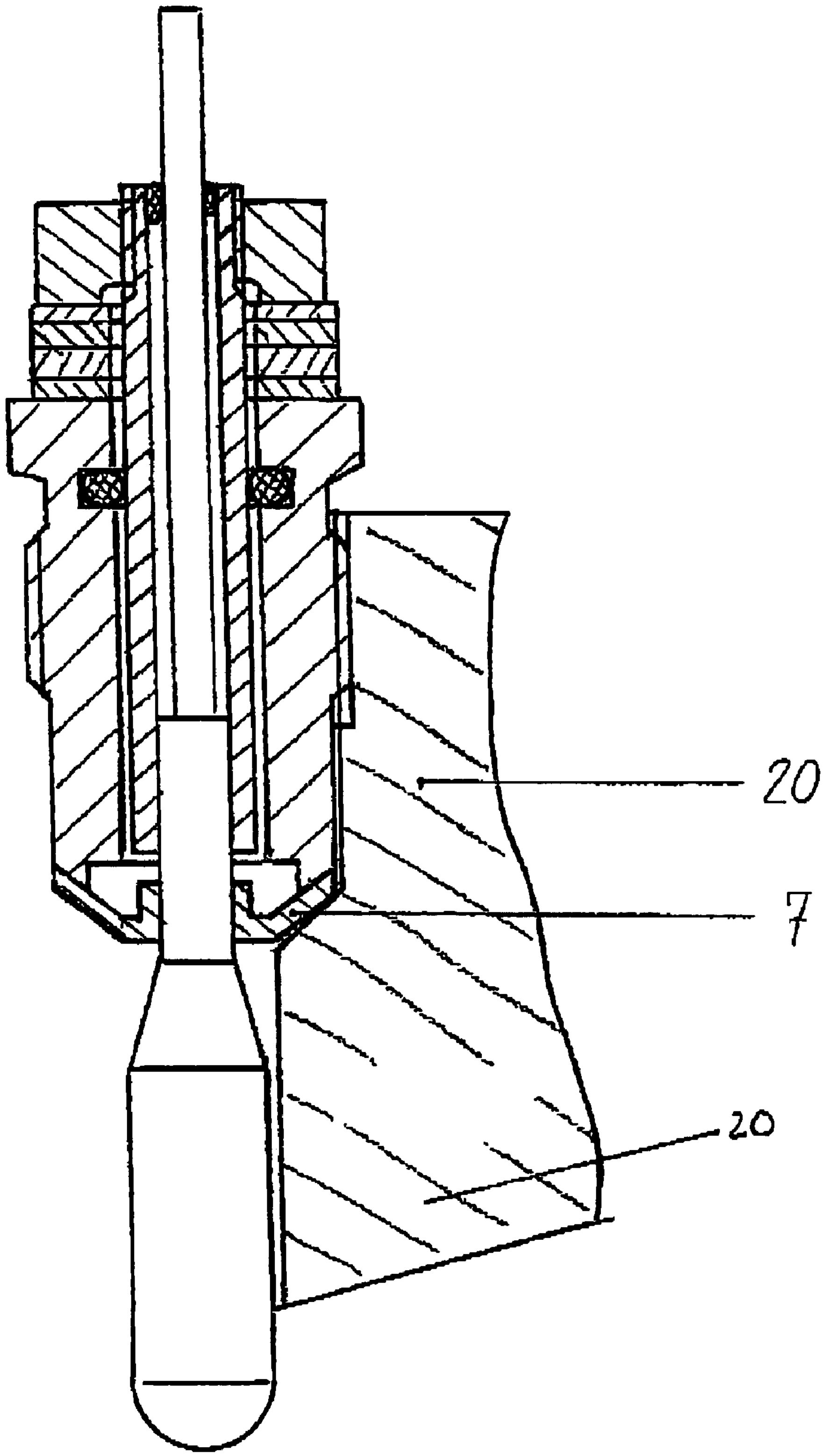
FIG. 4 is a sectional of a fourth embodiment of the pressure glow plug according to the invention.

FIG. 4 shows an embodiment of the pressure glow plug according to the invention, in which the glow plug body 2 is formed of only one part and its end that is directed toward the combustion chamber is provided with a membrane 7 that has the same function as the membrane 7 in the embodiment illustrated in FIG. 1. In the embodiment illustrated in FIG. 4, the membrane 7, however, simultaneously serves for sealing the glow plug body and forms the sealing surface for sealing the glow plug body due to the fact that it is externally fixed relative to the cylinder head 20.

In the embodiment illustrated in FIG. 5, the glow plug body 2 also is formed of only one part, wherein the internal seal of the glow plug body 2 relative to the heating rod 1 and the combustion chamber as well as the external seal are realized with a combination of O-rings 3 and 4. In this case, the O-ring 4 also serves for centering the extension of the heating rod 1 in the form of the contact tube 6.

Figure 5A:
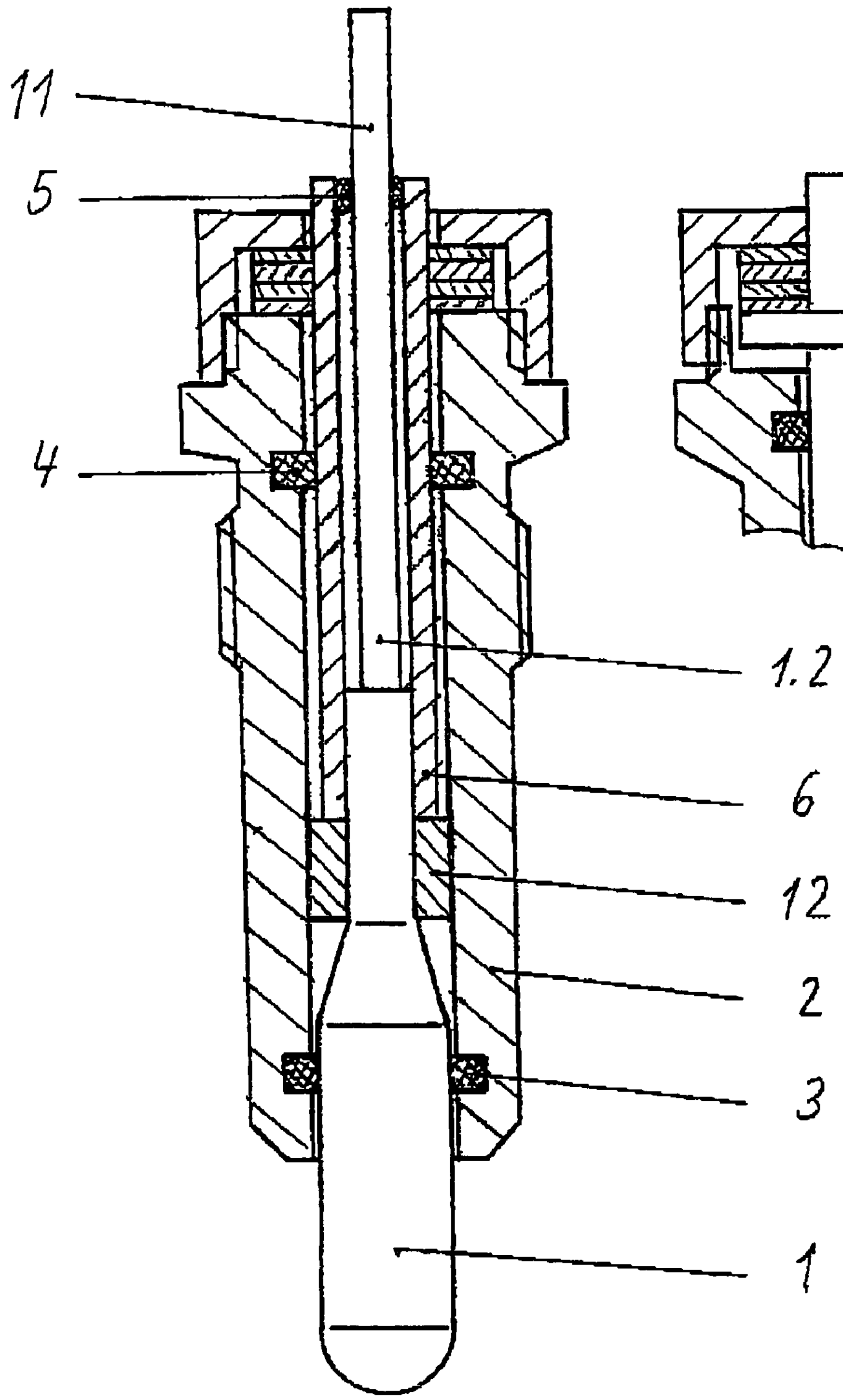
FIG. 5A, FIG. 5B and FIG. 5C are sectional views of three variations of a fifth embodiment of the glow plug according to the invention.

In the embodiment illustrated in FIG. 5A, a sliding element 12 is provided between the glow tube 1 and the glow plug body 2, wherein the sliding element is seated between the glow plug body 2 and the heating rod 1. The sliding element may also be arranged between the glow plug body 2 and the contact tube 6 and serves for guiding the heating rod 1 and for the primary centering of the heating rod 1 relative to the glow plug body 2.

Figure 5B:
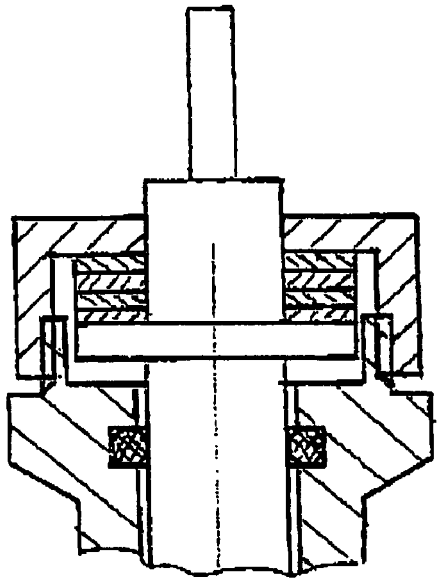
Figure 5C:
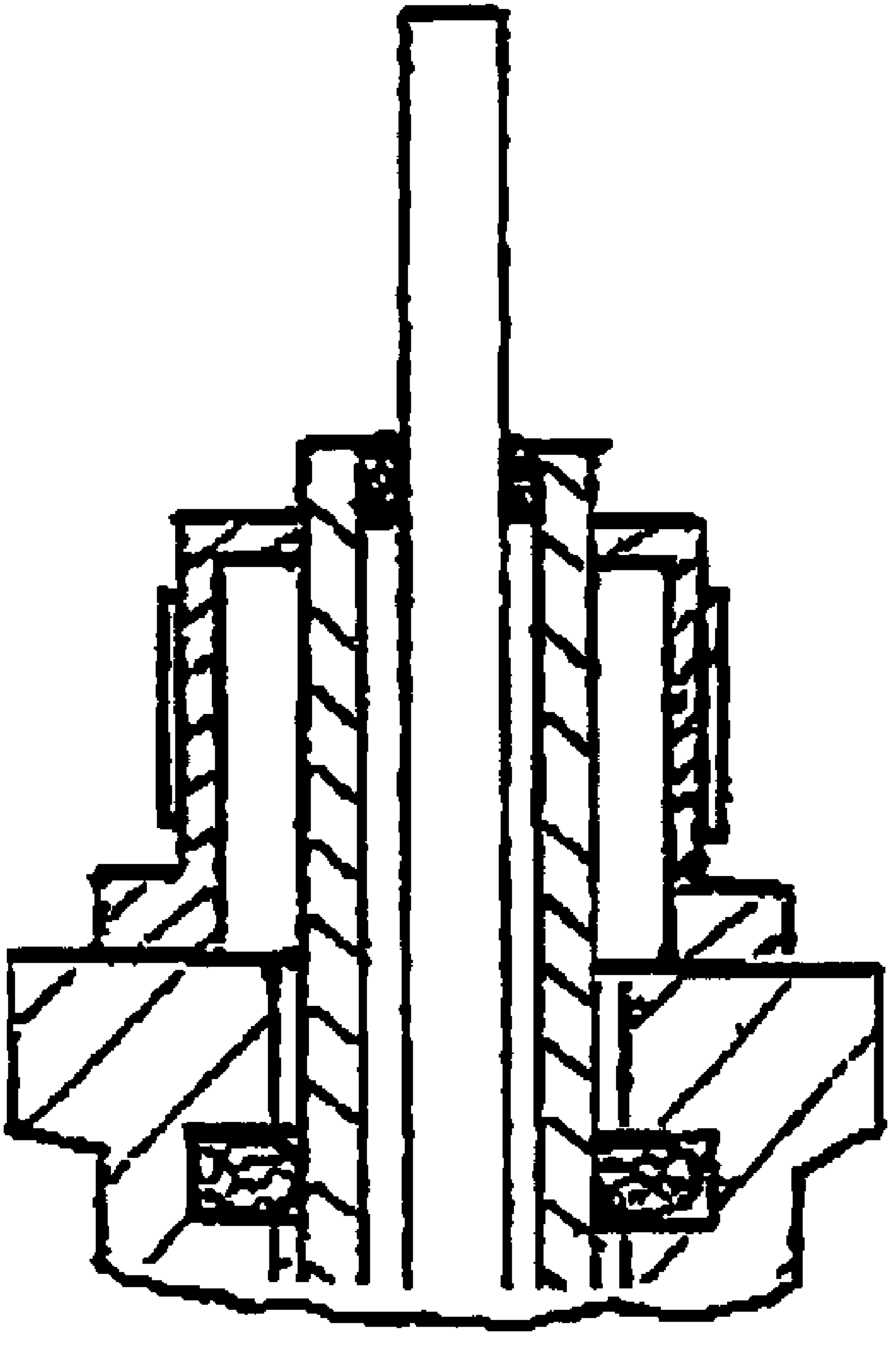

FIG. 5A shows a variation, in which the sensor arrangement lies, contrary to the arrangement illustrated in FIG. 1, on a shoulder of the contact tube 6; FIG. 5B shows a variation, in which the sensor arrangement lies on a ring that is fixed on the contact tube 6 of the heating rod 1, and FIG. 5C shows a variation with a sensor arrangement according to FIG. 3A.

In other respects, the sensor arrangement and its function are identical to those of the embodiments illustrated in FIGS. 2 and 3.

Figure 6A:
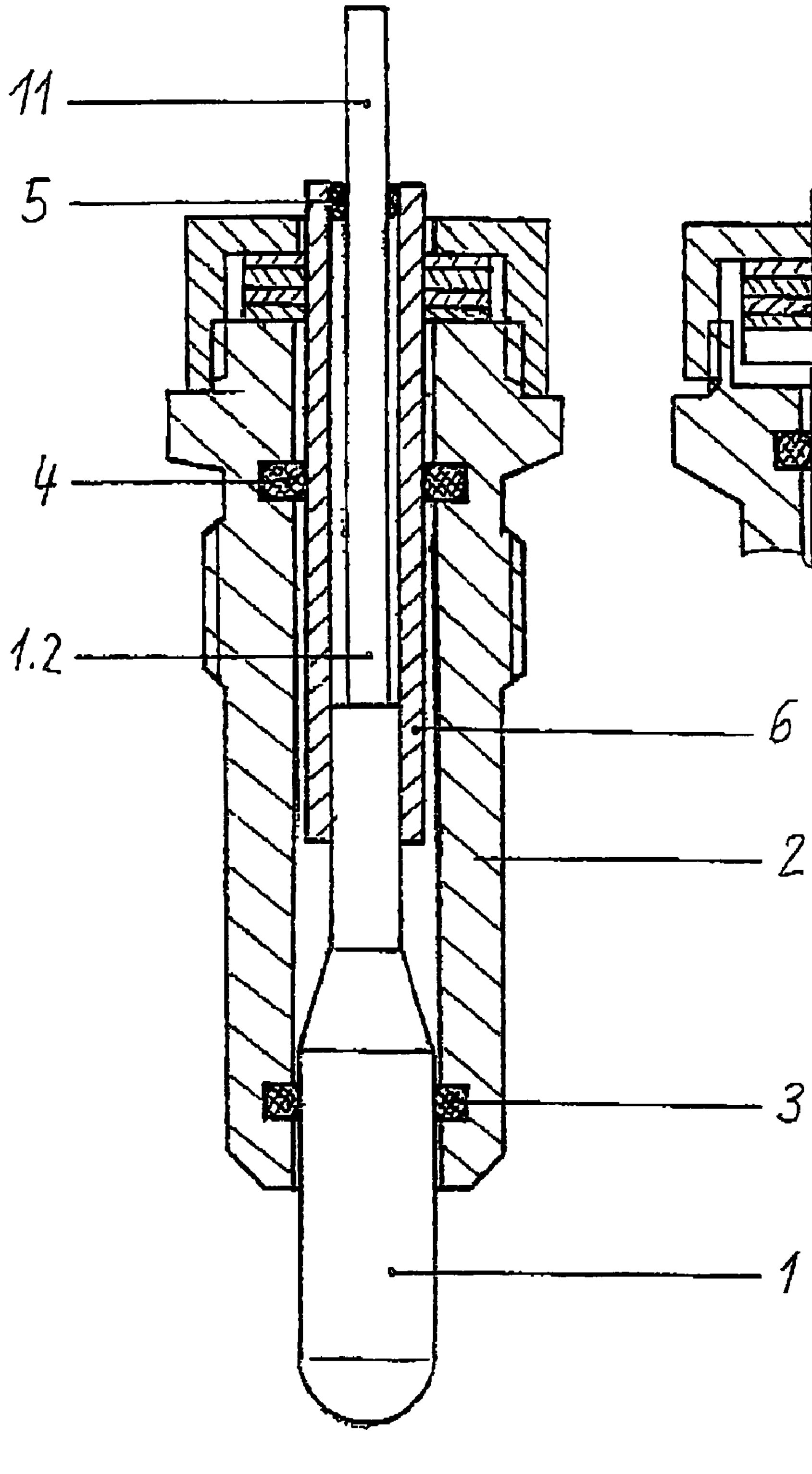
FIG. 6A and FIG. 6B are sectional views of two variations of a sixth embodiment of the pressure glow plug according to the invention.
Figure 6B:
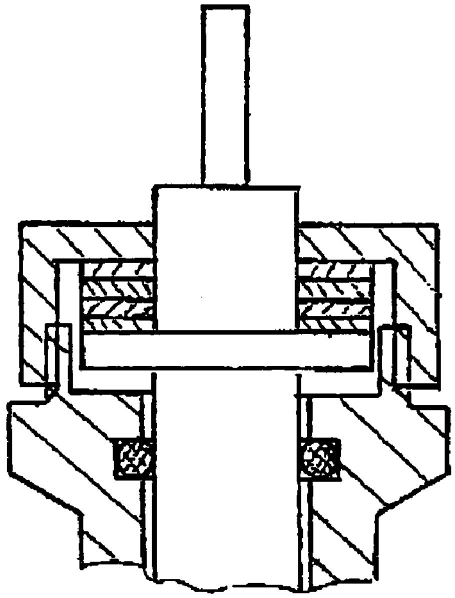

FIGS. 6A and 6B show another embodiment of the pressure glow plug according to the invention, wherein the design and function of this embodiment correspond to those of the embodiment illustrated in FIG. 5. However, a sliding element is not provided in this case. The heating rod 1 is supported in the glow plug body 2 in a floating fashion with the aid of the O-rings 3 and 4.

In this embodiment, the heating rod 1 exerts the highest force upon the sensor element such that the sensor element is subjected to the most significant pressure change in this case. This results in a more significant change in the charge state in dependence on the applied pressure.

The ground connection from the heating rod 1 to the glow plug body 2 may be produced with a separate ground wire or directly with the carrier element in the sensor arrangement 9 illustrated in FIG. 3.

The sensor arrangement and the function of the embodiment illustrated in FIG. 6 correspond to those of the embodiments illustrated in FIGS. 2 and 3.

In the pressure glow plug according to the invention, the heating rod 1 is moveably arranged in the glow plug body 2, for example, by means of a membrane, a sliding element and/or O-rings. This reduces the effect of the pressures produced by the combustion in the combustion chamber of the cylinder on the glow plug body. Due to this measure, the glow plug body no longer has to participate in the transmission of the combustion pressure.

What is claimed is:

1. A pressure glow plug for a diesel engine, comprising:
- a glow plug body for being inserted into a cylinder of the diesel engine,
- a linear heating rod that is arranged in the glow plug body, the heating rod extending completely through the glow plug body, and
- a pressure sensor that is arranged physically between the heating rod and the glow plug body under a prestress between the heating rod and the glow plug body
- in such a way that pressure in the combustion chamber of the cylinder acts upon the pressure sensor,
- wherein
- the heating rod is arranged in the glow plug body in an axially sliding fashion relative to the glow plug body and transmits the pressure in the combustion chamber of the cylinder to the pressure sensor by relative axial displacement of the heating rod relative to the glow plug body so as to act on the sensor that is disposed between them.

2. The glow plug according to claim 1, wherein the seal arranged between the glow plug body and the heating rod near connection end of the heating rod on the combustion chamber side consists of a sliding seal.

3. The glow plug according to claim 1, wherein the pressure sensor is arranged between the heating rod and the glow plug body under a prestress in such a way that the pressure sensor is relieved by the pressure in the combustion chamber of the cylinder that is transmitted by the heating rod.

4. The glow plug according to claim 1, wherein the pressure sensor is arranged between the heating rod and the glow plug body in such a way that the pressure sensor is subjected to the pressure in the combustion chamber that is transmitted by the heating rod.

5. The glow plug according to claim 1, wherein a flexible carrier element is arranged on the glow plug body on the connection side, wherein said carrier element carries a strain sensor, and wherein the pressure transmitted by the heating rod leads to an elongation of the carrier element in the axial direction.

6. The glow plug according to claim 1, wherein a seal is provided between the glow plug body and the heating rod in the area of an end that, in use, faces the combustion chamber side.

7. The glow plug according to claim 6, wherein a seal is provided between the glow plug body and the heating rod on the connection side.

8. A pressure glow plug for a diesel engine, comprising:
- a glow plug body for being inserted into a cylinder of the diesel engine,
- a heating rod that is arranged in the glow plug body, and
- a pressure sensor that is arranged between the heating rod and the glow plug body under a prestress in such a way that pressure in the combustion chamber of the cylinder acts upon the pressure sensor,
- wherein
- the heating rod is arranged in the glow plug body such that it can be displaced in an axially sliding fashion and transmits the pressure in the combustion chamber of the cylinder to the pressure sensor;
- wherein the glow plug body is divided into two parts in the axial direction, and wherein a radial membrane is arranged between the two parts and is rigidly connected to the heating rod.

9. The glow plug according to claim 8, wherein a seal is provided between the glow plug body and the heating rod near an electrical connection end of the heating rod.

10. The glow plug according to claim 8, wherein a seal is provided between the glow plug body and the heating rod in the area of an end that, in use, faces the combustion chamber.

11. The glow plug according to claim 10, wherein the seal is a sliding seal.

12. The glow plug according to claim 8, wherein a sliding element is arranged between the heating rod and the glow plug body.

13. The glow plug according to claim 12, wherein a flexible carrier element is arranged on the glow plug body on the connection side, wherein said carrier element carries a strain sensor, and wherein the carrier element is adapted to be elongated in the axial direction by the pressure transmitted by the heating rod.

14. The glow plug according to claim 12, wherein a seal is provided between the glow plug body and the heating rod in the area of an end that, in use, faces the combustion chamber.

15. The glow plug according to claim 12, wherein a seal is provided between the glow plug body and the heating rod near an electrical connection end of the heating rod.

16. A pressure glow plug for a diesel engine, comprising:
- a glow plug body for being inserted into a cylinder of the diesel engine,
- a heating rod that is arranged in the glow plug body, and
- a pressure sensor that is arranged between the heating rod and the glow plug body under a prestress in such a way that pressure in the combustion chamber of the cylinder acts upon the pressure sensor,
- wherein
- the heating rod is arranged in the glow plug body such that it can be displaced in an axially sliding fashion and transmits the pressure in the combustion chamber of the cylinder to the pressure sensor;
- wherein a membrane is arranged on the end face of the glow plug body that, in use, faces the on the combustion chamber side and is rigidly connected to the heating rod.

17. The glow plug according to claim 16, wherein a flexible carrier element is arranged on the glow plug body on the connection side, wherein said carrier element carries a strain sensor, and wherein the carrier element is adapted to be elongated in the axial direction by the pressure transmitted by the heating rod.

18. The glow plug according to claim 16, wherein a seal is provided between the glow plug body and the heating rod near an electrical connection end of the heating rod.

19. The glow plug according to claim 16, wherein a seal is provided between the glow plug body and the heating rod in the area of an end that, in use, faces the combustion chamber.

20. The glow plug according to claim 19, wherein the seal is a sliding seal.

* * * * *